(12) United States Patent
Acheson et al.

(10) Patent No.: US 10,678,528 B1
(45) Date of Patent: Jun. 9, 2020

(54) DIRECTORY SCHEMA DEPLOYMENT WITH PIPELINES

(71) Applicant: Amazon Technologies, Inc., Seattle, WA (US)

(72) Inventors: Alazel Acheson, Redmond, WA (US); Mahendra Manshi Chheda, Sammamish, WA (US); Srikanth Mandadi, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/819,170

(22) Filed: Nov. 21, 2017

(51) Int. Cl.
  *G06F 8/65* (2018.01)
  *G06F 11/36* (2006.01)
  *G06F 16/21* (2019.01)

(52) U.S. Cl.
  CPC ............ *G06F 8/65* (2013.01); *G06F 11/3688* (2013.01); *G06F 16/213* (2019.01)

(58) Field of Classification Search
  None
  See application file for complete search history.

(56) References Cited

U.S. PATENT DOCUMENTS

| | | | | |
|---|---|---|---|---|
| 6,871,346 B1* | 3/2005 | Kumbalimutt | .......... | G06F 9/454 718/104 |
| 8,769,102 B1* | 7/2014 | Zhou | ................... | G06F 11/3696 709/223 |
| 2004/0060044 A1* | 3/2004 | Das | ........................... | G06F 8/65 717/171 |
| 2006/0026168 A1* | 2/2006 | Bosworth | .................. | G06F 8/60 |
| 2006/0155716 A1* | 7/2006 | Vasishth | ................ | G06Q 10/06 707/999.1 |
| 2006/0155777 A1* | 7/2006 | Shih | ..................... | G06F 11/3672 |
| 2007/0150478 A1* | 6/2007 | Cho | .................. | H04L 29/12113 707/999.01 |

(Continued)

OTHER PUBLICATIONS

Quynh Dang, "Recommendation for Applications Using Approved Hash Algorighms," NIST Special Publication 800-107, Aug. 2012, 25 pages, Revision 1, United States of America.

(Continued)

*Primary Examiner* — Wei Y Zhen
*Assistant Examiner* — Binh Luu
(74) *Attorney, Agent, or Firm* — Davis Wright Tremaine LLP

(57) ABSTRACT

A system such as a service of a computing resource service provider, a directory service, a directory server, or any suitable system includes executable code that, if executed by one or more processors, causes the system to perform a first stage of a multi-stage deployment of a first directory schema by at least providing a second directory schema to a first computer system, wherein the first computer system is associated with a directory configured according to the first directory schema and causing the first computer system to reconfigure the directory according to the second directory schema The system may also determine, based on a result of reconfiguring the directory, whether to proceed to a second stage of the multi-stage deployment of the first directory schema. The system may be utilized as part of a directory schema update process wherein a multi-stage deployment pipeline is utilized.

20 Claims, 7 Drawing Sheets

(56) References Cited

U.S. PATENT DOCUMENTS

| | | | | |
|---|---|---|---|---|
| 2007/0150595 | A1* | 6/2007 | Bhorania | H04L 67/325 |
| | | | | 709/226 |
| 2008/0300943 | A1* | 12/2008 | Simpson | G06Q 10/06 |
| | | | | 705/7.23 |
| 2011/0083122 | A1* | 4/2011 | Chen | G06F 11/3664 |
| | | | | 717/124 |
| 2011/0252282 | A1* | 10/2011 | Meek | G06F 17/30557 |
| | | | | 714/54 |
| 2013/0152047 | A1* | 6/2013 | Moorthi | G06F 11/3688 |
| | | | | 717/124 |
| 2015/0033305 | A1* | 1/2015 | Shear | G06F 21/45 |
| | | | | 726/11 |
| 2016/0274994 | A1* | 9/2016 | Nikam | G06F 11/3608 |
| 2017/0220324 | A1* | 8/2017 | Balasubramanian | G06F 8/20 |
| 2018/0060065 | A1* | 3/2018 | Lai | G06F 8/71 |
| 2018/0081668 | A1* | 3/2018 | Eberlein | G06F 8/70 |

OTHER PUBLICATIONS

Wahl, M., "Lightweight Directory Access Protocol (v3): Attribute Syntax Definitions," Request for Comments: 2252, Standards Track, Dec. 1997, 28 pages.

* cited by examiner

US 10,678,528 B1

DIRECTORY SCHEMA DEPLOYMENT WITH PIPELINES

BACKGROUND

Directory servers and directory services are often utilized in the context of a distributed computing system that includes multiple users and computing resources. A directory server or directory service is often used to store hierarchal data regarding an organization, its users, and its computing resources. Data of a directory server or directory service is often defined according to a directory schema that specifies facets, attributes, constraints, indexes, objects, and more. Directories, in some cases, store millions of application-specific objects with multiple relationships and schemas.

Accordingly, applying changes to an existing directory schema such as upgrading a directory schema to support additional features, deprecate old features, etc. presents challenges to an organization or a service of a computing resource service provider hosting directory-related services to safely apply the update without breaking existing features. It is often difficult for system administrator and directory administrators to know, a priori, whether an update to a directory schema will cause breaking changes that lead to server downtime which may adversely impact the operation of an organization.

BRIEF DESCRIPTION OF THE DRAWINGS

Various techniques will be described with reference to the drawings, in which.

DETAILED DESCRIPTION

Figure 1:
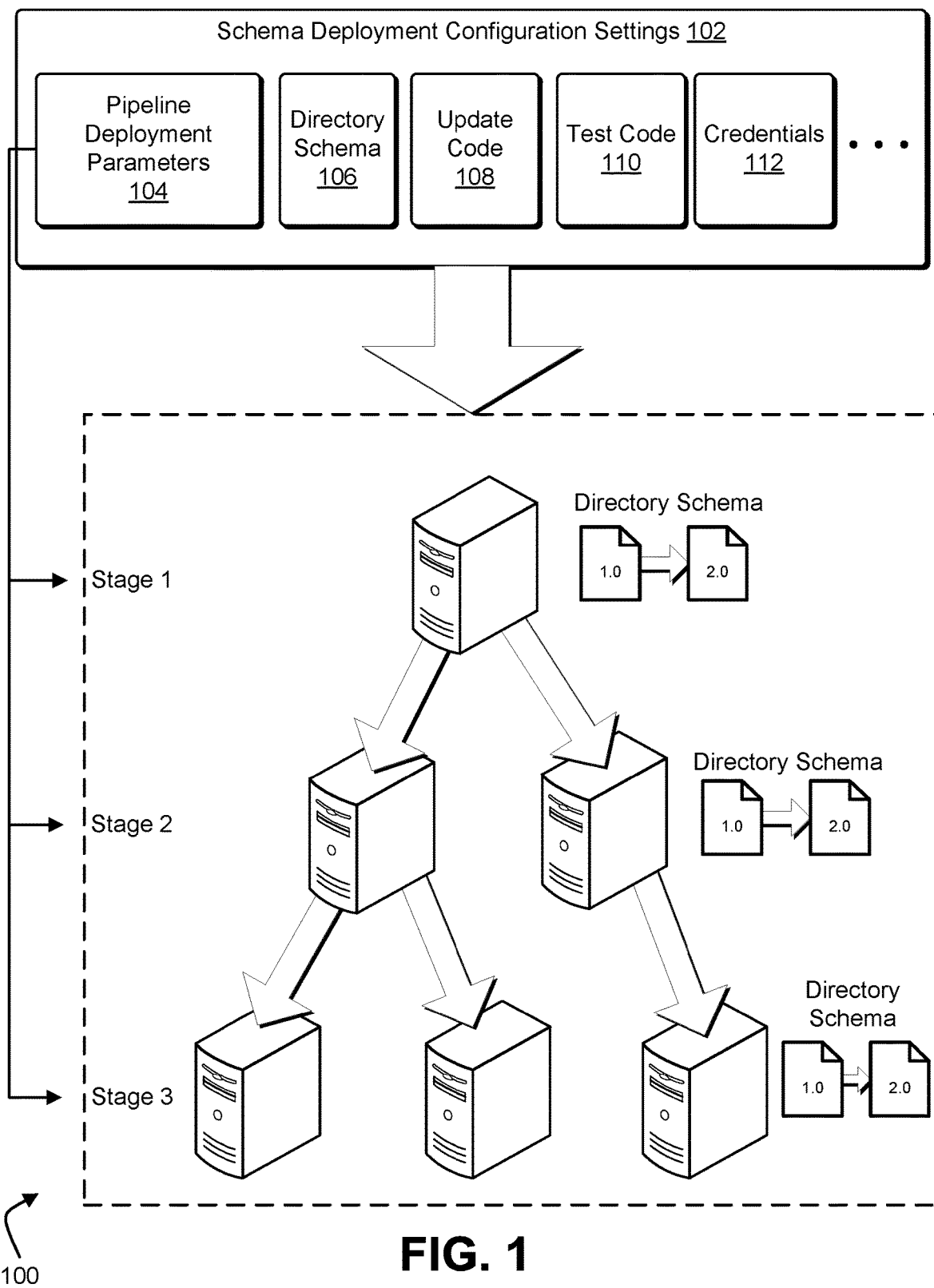
FIG. 1 illustrates a diagram of a system that implements various aspects of the present disclosure in accordance with an embodiment.

In an embodiment, a directory schema refers to the structure of a directory including attributes supported by the directory, the data type of the attributes (e.g., integer, floating point number, string, Boolean), matching rules, extensions, and more. In an embodiment, a directory is a Lightweight Directory Access Protocol (LDAP) directory that includes data that is usable in various contexts, such as user information for users of a network such as an intranet of an organization. In an embodiment, a directory is utilized within the context of a distributed system such as a computing resource service provider to store hundreds of millions of application-specific objects with multiple relationships and schemas. A directory service, in an embodiment, includes computer hardware and/or software configured to be a highly-available and highly-scalable directory store for customers' hierarchal data. In an embodiment, the directories are implemented in accordance with a directory schema (e.g., conforming to a first version of a standard such as LDAP) and data is stored, accessed, and managed in accordance with the first directory schema. In some cases, an update causes an update from a first directory schema to a second directory schema that causes a change to the schema, change to data stored in the directory accordance to the schema (e.g., data migration), changes to additional data based on the schema (e.g., indexes of the directory), and more.

In an embodiment, directory schema updates are applied using a deployment pipeline that defines how and under what conditions directory schema updates are deployed—for example, a test environment with one computer system is provisioned, a directory schema update is applied to the computer system, and one or more tests are run to verify that the directory schema update was applied successfully to the test machine and, contingent upon the update being successfully applied in the test environment, the update is rolled out to a fleet of production machines. In an embodiment, directory schema updates include updates to the directory schema (e.g., adding support for an additional attribute), updates to directory schema data (e.g., backfilling a newly added attribute using information from other attributes), and updates to information based on the directory schema (e.g., adding an index to sort on an existing or newly added attribute element). Accordingly, methods and systems for applying directory schema updates using deployment pipelines improve the operation of computer systems that utilize directory services by detecting errors in directory schema updates and performing mitigations (e.g., rolling back the update, notifying a system administrator), thereby reducing the impact of errors on clients of a directory service.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates a diagram of a system 100 in which a directory schema update is applied using a deployment pipeline in accordance with an embodiment. Schema deployment configuration settings 102 refer to information such as pipeline deployment parameters 104, a directory schema 106, update code 108, test code 110, and credentials 112. In an embodiment, the schema deployment configuration settings 102 encodes such information directly (e.g., includes a copy of the directory schema that should be updated to) or encodes a reference to such information, such as by including a uniform resource identifier (URI) that is usable to retrieve the information (e.g., a URI that references a network location where the directory schema can be read from). In an embodiment, the schema deployment configuration settings 102 is encoded, either entirely or in part, in a human-readable data-interchange format such as JavaScript Object Notation (JSON) or Extensible Markup Language (XML) format such as a JSON or XML file. In an embodiment, a client of a pipeline deployment service of a computing resource service provider uses a command line interface (CLI) or a user interface (UI) to specify one or more aspects of the schema deployment configuration settings 102—for example, in an embodiment, a UI includes one or more pages and/or dialogs that allow a client, via a web browser, to specify the pipeline deployment parameters 104 (e.g., via a separate UI that allows the client to visualize the pipeline and deployment process), specify a network location where the directory schema 106 can be obtained from, and so on.

In an embodiment, a directory schema 106 refers to a schema for a directory service such as a Lightweight Directory Access Protocol (LDAP) directory. In an embodiment, a directory schema defines all the objects and attributes that the directory service uses to store data and schema information comprises: attribute type definitions, object class definitions, and other information is usable (e.g., by a directory server) to determine how to match a filter or attribute value assertion (e.g., in a compare operation) against the attributes of an entry, how/whether to fulfill operations (e.g., Add and Modify operations), and more. In an embodiment, a client generates, defines, or other otherwise identifies a directory schema 106 that should be applied as part of a directory schema update. In an embodiment, a directory schema update involves upgrading a directory service from supporting one version of a directory protocol to a newer version of the protocol (e.g., updating a system from LDAP version 2 to LDAP version 3). In an embodiment, a directory schema update includes adding support for new attributes and/or backfilling data into the newly supported attribute fields.

In an embodiment, pipeline deployment parameters 104 refer to data (e.g., encoded in JSON format) that specify one or more parameters that are used to determine how directory schema updates are deployed within a computing system—for example, a directory schema update is to be deployed to hundreds or even thousands of production servers, and the pipeline deployment parameters 104 define how the directory schema update is propagated through the system. In an embodiment, the pipeline includes multiple stages, wherein a stage indicates a computing system or environment in which a schema update is to be applied—for example, a first pipeline stage, in an embodiment, is a "single-box" testing environment in which a test machine (e.g., a computer system such as a virtual computer system that is created, instantiated, or otherwise provisioned for testing purposes) is used to test whether the directory schema update was successful and then, after verifying that the actual outcome of the schema directory update in the test environment conforms to the expected outcome, a second stage of the pipeline is reached where a subset of the production servers receive the directory schema update. In an embodiment, if the directory schema update is successfully in the subset of production servers, the directory schema update is rolled out to additional servers in one or more subsequent stages. In an embodiment, the pipeline deployment parameters 104 specifies quality gates that must be satisfied in order to advance the update process from one stage of the pipeline to the next which includes, for example, executing test code 110 specified in the schema deployment configuration settings 102.

The update code 108 illustrated in FIG. 1 is, in an embodiment, executable code that, if executed by one or more processors of a computer system, causes the computer system to perform operations that apply a directory schema update. In an embodiment, execution of the update code 108 results in an update to the directory schema of the computer system to match the directory schema 106 included in the schema deployment configuration settings 102. In an embodiment, the update code 108 includes executable code that causes the computer system to backfill or otherwise adjust directory data as part of the directory schema update process. In an embodiment, the update code 108 includes migration code modifies existing directory data in a manner that makes the directory schema update a breaking change (i.e., it is not backwards compatible). As an example, update code 108 in an embodiment includes executable code that, if executed by one or more processors of a computer system, causes the computer system to, detect that a new attribute element from the directory schema 106 was successfully added to the directory server, and upon detecting that the new attribute element is supported by the directory server, use existing directory data to backfill the new attribute element. In an embodiment, backfilling data refers to a process in which data for a field in a directory (e.g., a field that is newly added by a directory schema update) is populated and/or updated with data in accordance with a specified set of rules. As an example, a directory entry has attribute elements such as FIRSTNAME and LASTNAME attributes that are mandatory elements (i.e., the attributes may not be empty), and a directory schema update adds an additional FULLNAME attribute element. In this case, the update code 108, in an embodiment, is executed and backfills the FULLNAME field in a specified format, such as "<LastName>, <FirstName>"—for example, for a directory entry having a FIRSTNAME value of "Marcus" and a LASTNAME value of "Marimoto" the backfilled value of FULLNAME is "Morimoto, Marcus" in accordance with an embodiment. Of course, other examples of backfilling exist, and the manner in which data is backfilled is specified in any suitable manner. Generally speaking, backfilling data is just one example of update code 108 in an embodiment, and the update code 108 includes executable code in connection with other processes.

In an embodiment, test code 110 includes executable code that, if executed by one or more processors of a computer system, causes the computer system to perform one or more tests that are used to verify functionality of a directory service. In an embodiment, test code includes executable code that initializes a directory service to an initial state, performs one or more operations and/or commands, and verifies one or more expected outcomes. For example, the test code provisions a test server with a directory service having a first directory schema, causes the test server to receive the directory schema 106, and runs update code 108 to update the first directory schema to the directory schema 106 included in the schema deployment configuration settings 102.

The credentials 112 illustrated in FIG. 1 include information that is usable to authenticate and authorize a computing entity, such as a security token that grants the bearer of the token authorization to perform one or more operations or requests. In an embodiment, the bearer of a token is able to present the token to an authorization service that verifies that the token grants permission to make a request to perform a directory schema update and fulfills the request (e.g., by routing the request to an appropriate service for performing the directory schema update). In an embodiment, a directory service or directory server receives a request to perform a directory schema update, authorizes and/or authenticates the requestor, determines whether the request should be fulfilled based at least in part on the request and/or the requestor's authorized actions, and if the request is authorized, fulfills the request. For example, in an embodiment, a system administrator is authorized to initiate a directory schema update, but other users (such as guests and standard users) are not authorized to update the directory schema (e.g., the request is denied). In an embodiment, the credentials 112 encode a role and/or information (e.g., a security token)

usable to assume the role. In an embodiment, the role is assumed to provision computing resources as part of the deployment of a stage of the pipeline and/or is assumed to execute code such as the update code 108 and the test code 110 illustrated in FIG. 1. In an embodiment, a role can be assumed in the manner described in accordance with FIG. 6.

As an example, in an embodiment, at a first stage of the deployment, a test server is provisioned and deployed (e.g., utilizing one or more services such as a virtual computer system service of a computing resource service provider) with an initial state (e.g., having an old directory schema that is to be updated), the directory schema update is applied by providing the directory service with the updated schema and/or running executable code related to the update and/or data migration that is to occur as part of the update. In an embodiment, operations, commands, and metrics related to the update are captured as logging data. In an embodiment, the pipeline deployment parameters 104.

In an embodiment, the directory schema 106 is a target directory schema that is deployed across multiple directories having different directories and directory versions. In an embodiment, a first directory is configured with a directory in accordance with a first version (e.g., version 1.0) and a second directory is, likewise, configured with a directory in accordance with the first version. Continuing with the example, an updated directory schema (e.g., version 2.0) is deployed, in an embodiment, and the deployment test fails on the second directory but succeeds on the first directory (e.g., due to a code defect affected by data present in the second directory but not the first directory); at a later point in time, the defect is corrected, and an update (e.g., version 3.0) is deployed to both the first directory (thereby updating the first directory from version 2.0 to version 3.0) and the second directory (thereby updating the second directory from version 1.0 to version 3.0). In an embodiment, the directory schema update is applied to a directory without regard to whether the directory has received intermediate updates.

Figure 2:
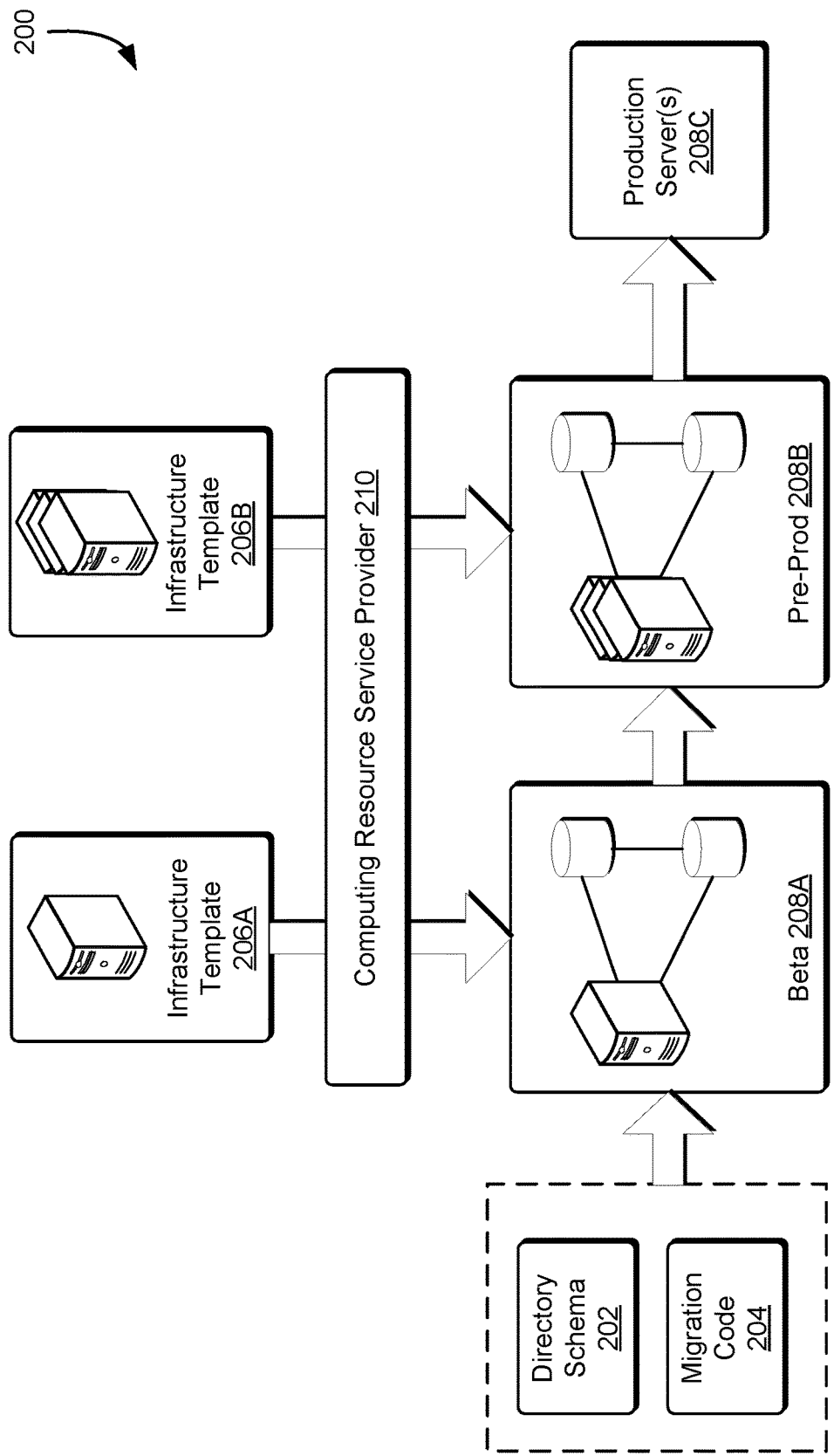
FIG. 2 illustrates a diagram of a system in which a directory schema update is applied in a multi-stage deployment pipeline.

FIG. 2 illustrates a diagram of a system 200 in which a directory schema update is applied in multiple stages of a deployment pipeline in accordance with an embodiment. In an embodiment, a deployment pipeline has multiple stages in which a directory schema update is deployed iteratively to the multiple stages of the deployment pipeline. In an embodiment, this type of multi-stage deployment is utilized so that errors and other unexpected behavior is detected earlier in the rollout of the directory schema update and mitigated (e.g., the update is rolled back) so as to minimize the impact to clients and customers.

In an embodiment, the system 200 is implemented at least in part using a computing resource service provider 210 comprising multiple services that provide various types of computing resources such as a virtual computer system service, a data storage service, a directory service, and more. In an embodiment, a virtual computer system service includes hardware, software, or combination thereof configured to instantiate virtual machine instances on behalf of a client (e.g., a computing entity performing a directory schema update). In an embodiment, the client interacts with the virtual computer system service (e.g., via appropriately configured and authenticated API calls) to provision and operate virtual computer systems that are instantiated on physical computing devices hosted and operated by the computing resource service provider. A virtual computer system, in an embodiment, is suitable for providing computing power to run applications, software, and, generally speaking, any type of executable instructions/code. It should be noted that while a virtual computer system service is discussed in connection with FIG. 2, any other computer system or computer system service may be utilized in the computing resource service provider, such as a computer system or computer system service that does not employ virtualization or instantiation and instead provisions computing resources on dedicated or shared computers/servers and/or other physical devices. In an embodiment, one or more virtual machine instances are provisioned during a stage of a deployment pipeline to execute the migration code 204—however, such need not be the case, as the migration code 204, in one or more stages of a deployment pipeline in accordance with an embodiment is executed on computer systems that have been previously been provisioned and initialized to perform other tasks (e.g., a directory server in a production environment is initialized to provide directory services and migration code 204 is later provided to the directory server to update the directory server's existing directory schema).

In an embodiment, a data storage service refers to one or more computing resources that collectively operate to store data for a client computer system, for example, using block-level storage devices (and/or virtualizations thereof). In an embodiment, data storage devices of the data storage service operationally attached to virtual computer systems provided by the virtual computer system service to serve as logical units (e.g., virtual drives) for the computer systems. A data storage device, in an embodiment, enables the persistent storage of data used/generated by a corresponding virtual computer system where the virtual computer system service may only provide ephemeral data storage. In an embodiment, a data storage service is utilized to store the directory schema 202 and/or migration code 204 and such information is retrieved by a computer system (e.g., a virtual machine instance or a production server) during a deployment. In an embodiment, a request to access data of the data storage service is authenticated and authorized as one or more steps included in the processing of the request.

In an embodiment, the system in FIG. 2 illustrates a directory schema update deployed over multiple stages of a pipeline. In an embodiment, the stages of the pipeline, the directory schema 202, and the migration code 204 are specified by schema deployment configuration settings, such as those described in connection with FIG. 1. In an embodiment, an infrastructure template 206A encodes information usable to identify a set of computing resources wherein the set of computing resources, when provisioned, are usable in connection with a directory schema update (e.g., the directory schema update is applied to a directory service of the set of computing resources). For example, as illustrated in FIG. 2, the infrastructure template 206A encodes (e.g., in a human-readable data-interchange format such as JavaScript Object Notation) a set of computing resources and/or configurations of the computing resources to form a first stage of a deployment pipeline (e.g., the beta stage 208A illustrated in FIG. 2). For example, in an embodiment, a JSON file encodes a setup for a virtual machine instance specifying hardware and software configurations. In an embodiment, a service of a computing resource service provider (e.g., a pipeline deployment service) parses the infrastructure template 206A and provisions a set of computing resources in accordance with the infrastructure template 206A—for example, by utilizing services of the computing resource service provider such as the virtual computer system service described above.

A deployment pipeline, in an embodiment, has multiple successive stages—for example, a first stage 208A, a second stage, 208B (e.g., Pre-Prod 208B illustrated in FIG. 2), and a third stage 208C (e.g., Production Server(s) 208C illustrated in FIG. 2), as illustrated in FIG. 2, although greater or fewer numbers of stages can also be specified. In an embodiment, a first infrastructure template 206A is used to provision a first set of computing resources (e.g., using the computing resource service provider 210) for a first stage 208A of the pipeline. In an embodiment, the first stage 208A is a beta stage of the pipeline in which the computer systems are on a test network (e.g., isolated from production servers) so that testing of a directory schema update does not affect production servers that are accessed by customers. In an embodiment, the first stage 208A is provisioned with an initial state wherein an older version of a directory schema is provisioned on a computer system, the directory schema 202 is provided to the system either together with or separate from migration code 204 and the computer system updates the schema of the existing directory service to the new directory schema 202 specified by the update package and/or runs migration code 204 such as data migration code to backfill newly supported attributes in the update.

In an embodiment, successful deployment of the directory schema to a first stage 208A of the pipeline is used as an indicator to provision computing resources for a second stage 208B of the pipeline and to perform a directory schema update using the computing resources of the second stage 208B. In an embodiment, a second infrastructure template 206B defines a set of computing resources that are different from those specified in another stage of the deployment pipeline. For example, in an embodiment, FIG. 2 illustrates a deployment pipeline in which the first stage 208A of the pipeline is utilized to verify that a directory schema update applied to a single computer system is successful and then, contingent upon the first stage 208A of the pipeline being successfully deployed, the second stage 208B of the deployment pipeline is used to verify that multiple machines having a common directory schema are updated successfully.

It should be noted that successful deployment of a directory schema, in an embodiment, refers to performing an update to an existing directory schema of a directory service or directory server, execution of migration code, successful execution and verification of test code validating one or more aspects of functionality of the directory service or directory server, and any combination thereof. For example, in an embodiment, quality metrics are defined and are used to gate progress of the deployment between stages of the deployment pipeline. In an embodiment, a set of unit tests are specified for a stage of the deployment, and the deployment fails if the unit tests do not pass—for example, the unit tests, in an embodiment, verify one or more aspects of the functionality of the directory schema, such as whether an attribute added to the directory schema as part of the update is usable with new and existing user entries and/or whether data was correctly backfilled to a newly supported attribute.

Computing resources need not be provisioned in accordance with an infrastructure template, such as in the case where the directory schema update is applied a third stage 208C wherein the third stage includes production servers that have been previously provisioned and used to implement directory servers and directory services that customers are able to access. In an embodiment, one or more pre-production stages of a deployment pipeline are utilized to validate various aspects of a directory schema update so as to provide quality assurances that a deployment to production servers will be successful, thereby limiting the potential impact on customers.

In an embodiment, an infrastructure template can be processed by a target execution environment to update the configuration of the target execution environment. The configuration may involve any infrastructure-level configuration, where the infrastructure itself is instantiable, modifiable, and/or definable by machine readable executable code. In an embodiment, an infrastructure template, when processed by an entity associated with the target execution environment, updates operational parameters of virtualized devices associated with the target execution environment to an equivalent state associated with the monitored development environment changes from which the infrastructure template was generated.

Figure 3:
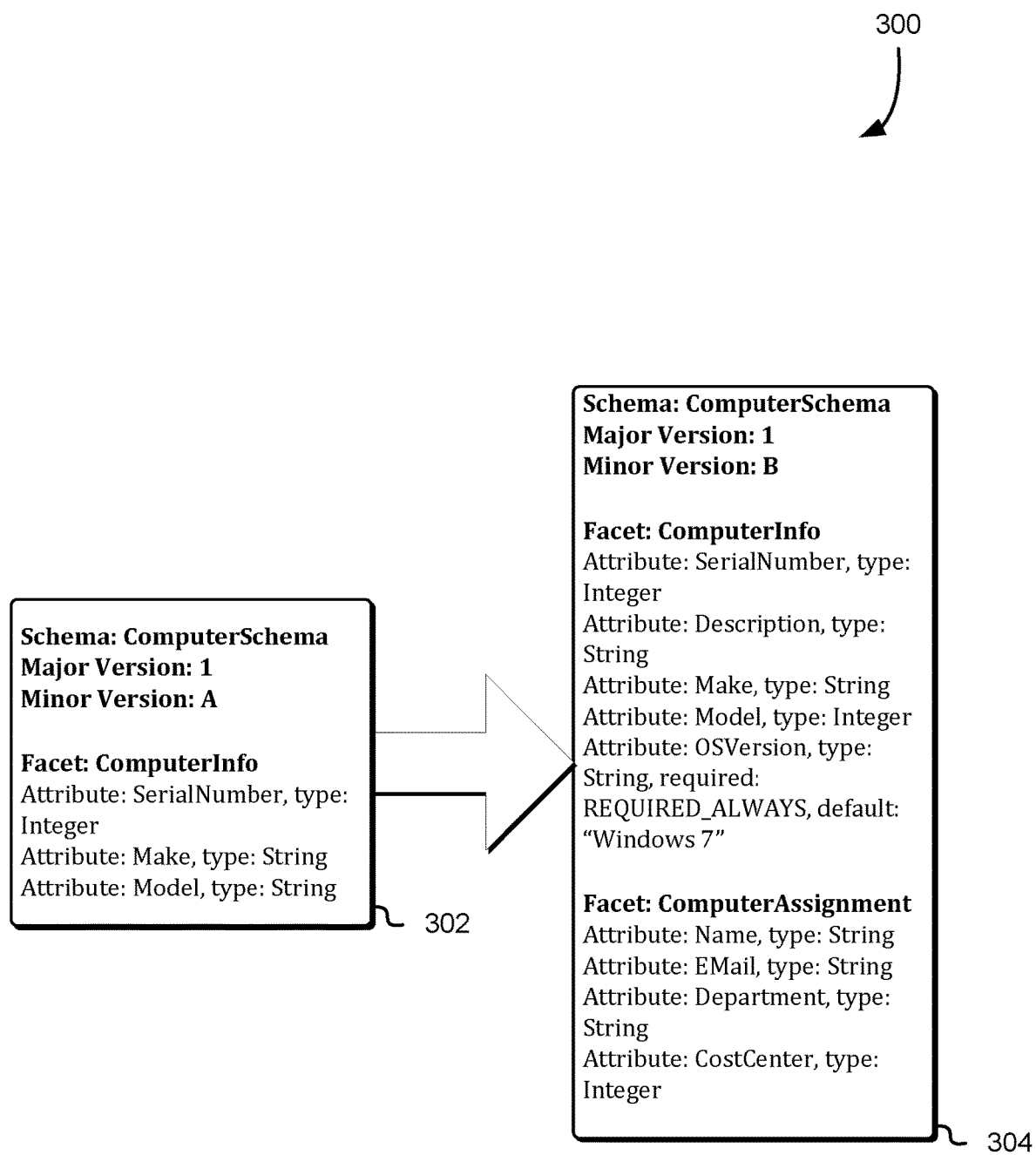
FIG. 3 illustrates a diagram of directory schemas, in accordance with one embodiment.

FIG. 3 illustrates a diagram 300 of directory schemas in accordance with an embodiment. For example, in an embodiment, a directory service is update from supporting the first directory schema 302 shown in FIG. 3 to supporting the second directory schema 304 shown in FIG. 3 that, among other things, supports additional facets, attributes, indexes, and more. In an embodiment, the directory schemas discussed in connection with FIG. 3 are implemented in the context of systems and processes described elsewhere, such as in connection with FIGS. 1, 2, and 4-6.

In an embodiment, a directory schema defines the types of objects that can be created within a directory and enforces validation of data for each object class and handles changes to the directory schema over time. In an embodiment, a directory schema defines facets, attributes, and constraints of a directory. In an embodiment, a directory schema defines various types of objects such as users, devices, and organizations. In an embodiment, a directory schema is applied to a directory and data within the directory conforms to the applied schema accordingly, a directory definition acts as a blueprint that is used, in an embodiment, to construct multiple directories with applied directory schemas that overlap at least in part. In an embodiment, a directory service is a service of a computing resource service provider and supports web service API requests to create, read, update, and delete directory schema data.

In an embodiment, a directory schema comprises facets, attributes, and constraints. In an embodiment, a facet refers to a set of attributes associated with an object in the directory for example, a facet is an object class of a Lightweight Directory Access Protocol (LDAP) directory schema. In an embodiment, the directory service defines a threshold maximum number of facets per directory schema. In an embodiment, each facet has a corresponding independent set of attributes and each facet includes fundamental metadata such as the facet name, version information, and behaviors. In an embodiment, the set of object facets, their constraints, and the relationships between them correspond to an abstraction of a directory schema definition. In an embodiment, the directory schema facets are used to further define constraints over attributes allowed in an object, policy types allowed to be applied to an object, and more. In an embodiment, the combination of the directory schema identifiers (e.g., resource name identifiers), facets, and attributes uniquely define an object within the context of a directory service. In an embodiment, other information is usable to uniquely define an object, such as a primary key, an auto-incrementing object id, and more. In an embodiment, a facet of a directory schema is uniquely defined by its name (i.e., two facets of a directory schema cannot have the same name). In an embodiment, a directory schema update includes creating, updating, and/or deleting a facet. In an embodiment, a directory schema update lacks backwards compatibility, such as in the case where a facet is deleted as part of a directory schema update. FIG. 3, in an embodiment, illustrates an example in which a directory schema is updated with the creation of an additional facet "ComputerAssignment" that includes attributes.

An attribute, in an embodiment, has one or more rules that act as constraints in the permissible values of the attribute. For example, in FIG. 2, the "SerialNumber" has a corresponding integer data type that constrains the permissible "SerialNumber" values to integers. In an embodiment, additional rule types exist, such as rules that constrain the length of a string attribute value (e.g., setting a minimum and/or maximum string length), rules that constrain the length of a binary attribute value (e.g., setting a minimum and/or maximum number of bits in length of a binary attribute value), rules that constrain the valid values of a string attribute (e.g., the string attribute value must be one of an enumerated list of string values, either matching literally or with wildcards), rules that constrain the attribute to have a non-empty or non-zero value, rules that supply a default value for an attribute if none is explicitly specified in the directory schema, and any combination thereof. In an embodiment, a directory schema update includes changing the data type of an existing attribute from one type to another (e.g., Integer to String type).

FIG. 3 illustrates a first directory schema 302 and a second directory schema 304 which, in an embodiment, are related as different version of a directory schema (e.g., the first directory schema 302 is an earlier version 1A of a directory schema and the second directory schema 304 is a newer version 1B of the directory schema). As part of a directory schema update, from version 1A to 1B, an directory schema update is deployed that adds additional attributes to the existing "ComputerInfo" facet such as the "Description" and "OSVersion" attributes, and a "ComputerAssignment" facet is added to the directory schema. Furthermore, in an embodiment, data is backfilled to existing directory data—the "OSVersion" attribute is indicated to be "REQUIRED_ALWAYS" and, as part of a backfilling process, existing data with the default value indicated in the directory schema.

A directory service, in an embodiment, supports indexing of directory data that allows for searching and sorting on attribute values. In an embodiment, value based and type based indexing are supported, wherein type-based indexing refers to searching for objects in a directory based on object type and value-based indexing refers to searching for objects in a directory based on the object value of the attribute. In an embodiment, object types are defined based at least in part on facets. In an embodiment, an index of a directory is used to generate a listing of objects by attribute or facet values. For example, in an embodiment, an index is generated based on the "Make" and "Model" attributes as described in connection with FIG. 3. In an embodiment, a directory service supports one or more web service APIs that allow the creation, modification, enumeration, and deletion of indexes and a client of the directory service is able to generate requests using such web APIs and have such requests fulfilled (e.g., after the request is authenticated and authorized).

In an embodiment, indexes are implemented as nodes with children (e.g., a binary tree or, more generally, an n-ary tree structure) where the links to the indexed nodes are labeled based on the indexed attribute values rather than being given a label when the child node is attached. In an embodiment, index links are not necessarily parent-child edges. In an embodiment, indexes of a directory are enumerated via a set of web service APIs exposed and/or implemented by a directory service of a computing resource service provider. In an embodiment, the indexes are not automatically populated and, instead, a web service API is used to directory attach and detach objects to/from the index. In an embodiment, a client (e.g., system administrator, directory administrator) of a directory service determines a subset of the directory objects to index, and uses a web service API to index only the subset of the directory objects. Alternative implementations are contemplated in the scope of the disclosure as well—in an embodiment, some or all objects of a facet are indexed, a subset of the some or all objects are identified for removal, and a web service API is called to remove the subset of objects from the index. In an embodiment, the removal is performed iteratively (e.g., looping through a list of objects and removing them individually) or in a batched call (e.g., a list of objects to remove from the index is provided in a single web service API call that atomically removes the list of objects from the directory). In an embodiment, a directory is indexed according to a scope of the directory—for example, based on direct children of a specific node, all objects under a local root, all nodes in a department (e.g., a facet), and so on. In an embodiment, a matching rule is used to compare attribute values against assertion values when performing search and compare operations.

Unique indexes and non-unique indexes are supported by a directory service, in accordance with an embodiment wherein a unique index enforces uniqueness on one or more attributes for values that are attached to the index. For example, an index on the "SerialNumber" attribute of a directory schema illustrated in connection with FIG. 3, in accordance with an embodiment, is a unique index wherein no two objects have the same serial number—as a second example, an index on the "Make" and "model" attributes of the directory schema illustrated in connection with FIG. 3 is, in an embodiment, a non-unique index attribute.

Figure 4:
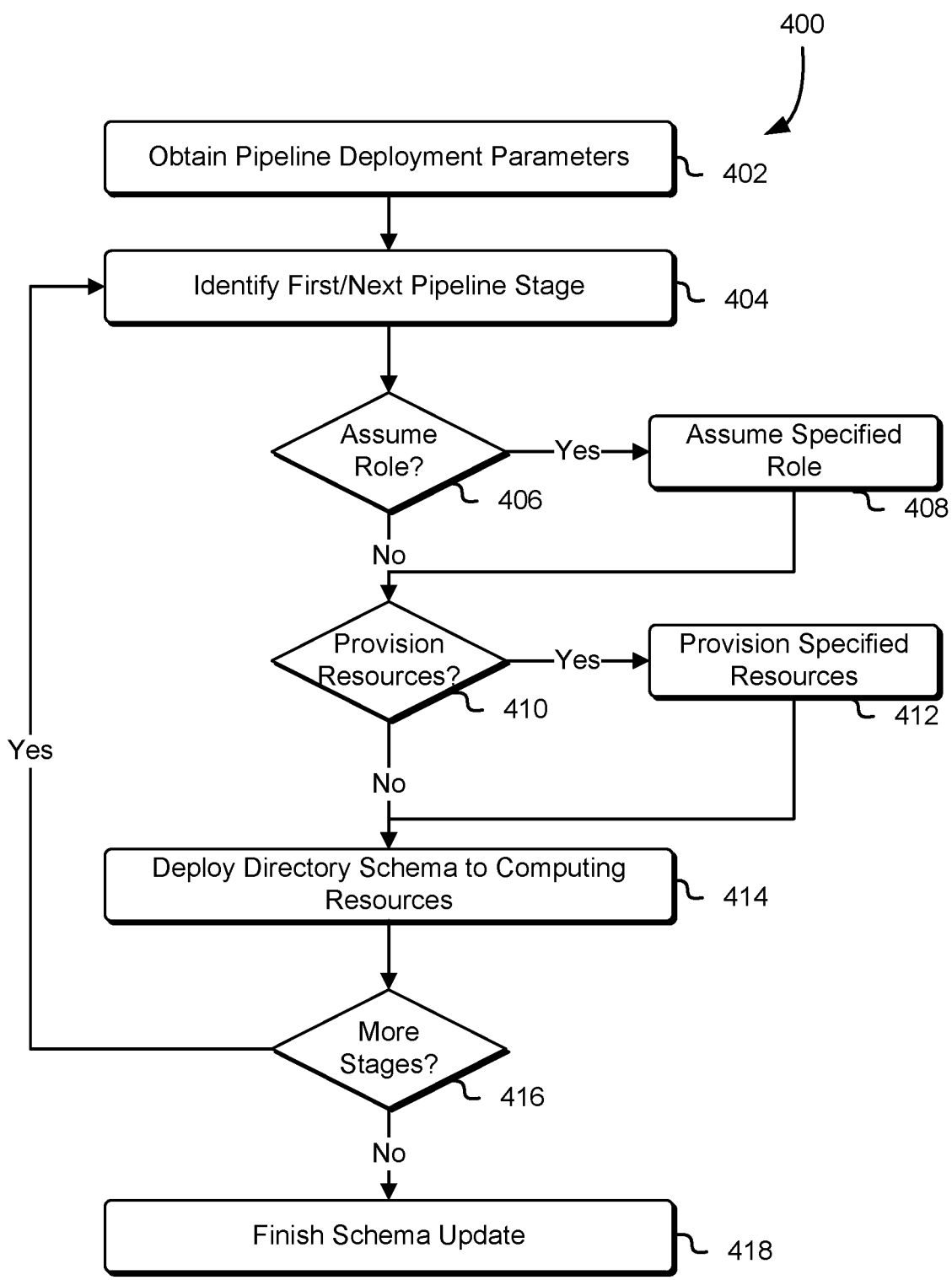
FIG. 4 illustrates a process for performing a directory schema update using a deployment pipeline, in accordance with one embodiment.

FIG. 4 shows an illustrative example of a process that, as a result of being performed by a suitable system, performs a directory schema update is applied using a deployment pipeline in accordance with at least one embodiment. The process illustrated in the flowchart 400 may, generally speaking, be performed by any suitable computing entity such as by a directory service of a computing resource service provider, a server computer system (e.g., a directory server), and more. In an embodiment, the process illustrated in FIG. 4 is performed in accordance with system described in connection with FIGS. 1, 2, and 6. In an embodiment, the process is implemented by the same system that implements a process described in accordance with FIG. 5, as described elsewhere in this disclosure, although such need not be the case—the aforementioned processes, in an embodiment, are implemented by separate computer systems. In an embodiment, a suitable computer comprising memory and one or more processors includes executable instructions that, if executed, cause the one or more processors of the computer system to perform the steps 402-418 described in connection with FIG. 4 A suitable computer system, in an embodiment, refers to a computer system such as those described elsewhere in connection with FIG. 6.

In an embodiment, a system performing the process obtains 402 pipeline deployment parameters. In an embodiment, pipeline deployment parameters refer to data (e.g., encoded in JSON format) that specify one or more parameters that are used to determine how directory schema updates are deployed within a computing system. In an embodiment, a user such as an engineer or quality assurance agent creates a JSON file and/or fills the JSON file with elements that includes an updated directory schema (or information usable to obtain the updated directory schema) one or more directories associated with one or more stages of a deployment pipeline. Furthermore, computing resources, in an embodiment, are associated with respective stages of the pipeline and include test code, directory servers, security permissions, and more. Information included in the JSON file, in an embodiment, is a set of parameters for a multi-stage deployment of a directory schema to a set of directories.

Upon obtaining the pipeline deployment parameters, the system may identify 404 a first pipeline stage. In an embodiment, the pipeline deployment parameters include multiple pipeline stages that can be executed in parallel or are otherwise not dependent on the successful execution of another stage of the pipeline. In an embodiment, the first pipeline stage refers to a pipeline stage which is not dependent on the successful execution of another stage of the pipeline. In an embodiment, the first pipeline stage is identifiable based on the pipeline deployment parameters, which may include an ordering of pipeline stages wherein subsequent stages of the ordering are executed contingent upon earlier stages of the pipeline having been successfully deployed.

In an embodiment, the system determines whether 406 to assume a role. In an embodiment, the pipeline deployment parameters indicate, for one or more stages of the pipeline, a role to assume, and the absence of an indicated role indicates that no role should be assumed. In an embodiment, an XML tag of an XML-based pipeline deployment parameter indicates the resource name identifier of a role that the system should assume when deploying the directory schema. In an embodiment, if the system determines a role should be assumed, the system assumes a role by submitting a request to an authorization and/or authentication service and receives, in response, a token associated with the role provided by the authorization and/or authentication service that is usable to assume the role. A role, in an embodiment, has a set of permissions that grant and/or deny access to computing resources of a computing resource service provider—the permissions associated with the role may differ from the permissions associated with the system that assumes the role. In an embodiment, a trust relationship must exist between a user and a role for the user to be able to successfully assume the role (e.g., a database table stores mappings between principals and roles that the principal is allowed to assume). In an embodiment, the system uses a security token to assume 408 the specified role by issuing a request comprising the token and an authorization service receives the requests, verifies that the permissions associated with the role are sufficient to allow fulfillment of the request, and indicates that the request should be fulfilled (e.g., by routing the request to the appropriate service for fulfillment). It should be noted that in an embodiment, assuming a role refers to the process of obtaining a security token associated with the role, performing actions under the role (e.g., issuing a request comprising the security token to a service), or both. In an embodiment, a suitable system assumes a role in the manner described in accordance with FIG. 6.

In an embodiment, the system determines whether 410 to provision resources. In an embodiment, a set of computing resources are created, setup, initialized, or otherwise provisioned for use in a test environment wherein a test server (e.g., a virtual machine instance) is created and initialized for use in a particular stage of a pipeline deployment and then deinitialized or otherwise deprovisioned after testing of the stage is complete. In an embodiment, the system provisions 412 specified resources which may include utilizing services of a computing resource service provider to create, initialize, allocation, or otherwise provision resources such as virtual computer systems, data storage system, and directory systems/services.

In an embodiment, the pipeline deployment parameters reference existing computing resources in association with a deployment stage. In an embodiment, a stage of a pipeline refers to a deployment server of a production service that includes an operational (e.g., used to service client requests) directory service wherein the referenced directory service is to receive a directory schema update.

In an embodiment, the system deploys 414 a directory schema to computing resource referenced by the pipeline deployment parameters in association with the current stage of the deployment. In an embodiment, a directory schema update is applied by providing the directory service with the updated schema and/or running executable code related to the update and/or data migration that is to occur as part of the update. In an embodiment, a directory schema update is applied for a stage of a pipeline in accordance with the process (or a portion thereof) described in connection with FIG. 5.

The system, in an embodiment, determines whether 416 there are more stages to the deployment, such as by parsing a JSON file that includes the pipeline deployment parameters for whether there are any pipelines dependent on the successful completion of the current pipeline. In an embodiment, if there are additional stages detected, the system repeats steps 404-416 (or portions thereof) until no more stages are detected, at which time the system finishes 418 the schema update. In an embodiment, the system terminates the deployment at an earlier time if a termination condition is satisfied, such as the failure of a stage of the pipeline.

Figure 5:
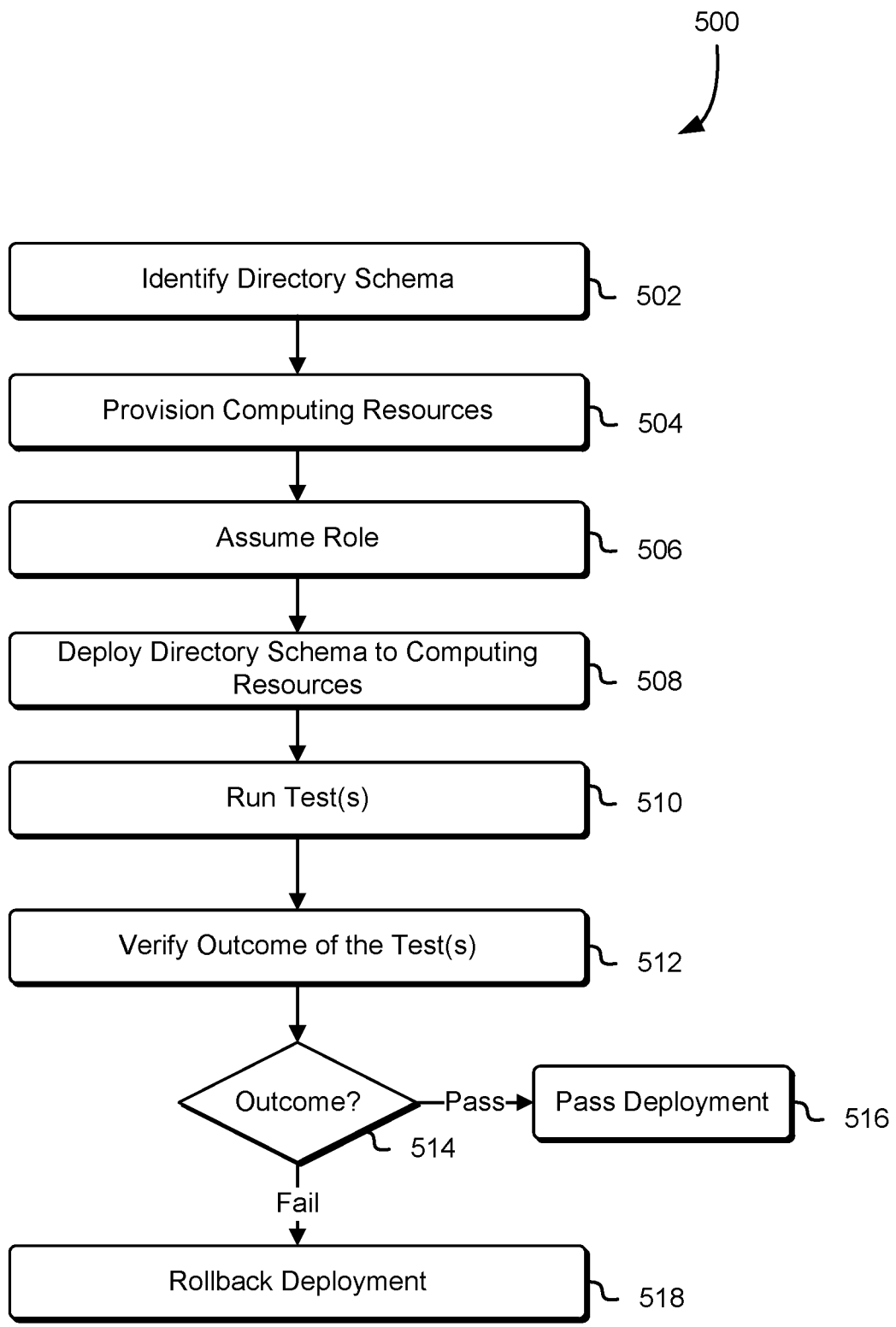
FIG. 5 illustrates a process for updating a directory schema of a directory service or directory server, in accordance with one embodiment.

In an embodiment, techniques such as those described above and below in connection with FIG. 4 and/or FIG. 5 are utilized by the system to receive a set of parameters for a multi-stage deployment of a directory schema to a set of directories; perform a first stage of the multi-stage deployment of the directory schema according to the set of parameters by at least: selecting a first subset of the set of directories, reconfiguring the first subset to update from a previous directory schema to the directory schema, and testing the first subset after reconfiguring the first subset; and in response to successful testing of the first subset, performing a second stage of the multi-stage deployment to deploy the directory schema to a second subset of the set of directories.

FIG. 5 shows an illustrative example of a process that, as a result of being performed by a suitable system, implements updating a directory schema in accordance with at least one embodiment. The process illustrated in the flowchart 500 may, generally speaking, be performed by any suitable computing entity such as by a directory service of a computing resource service provider, a server computer system (e.g., a directory server), and more. In an embodiment, the process illustrated in FIG. 5 is performed in accordance with system described in connection with FIGS. 1, 2, and 6. In an embodiment, the process is implemented by the same system that implements a process described in accordance with FIG. 4, as described elsewhere in this disclosure, although such need not be the case—the aforementioned processes, in an embodiment, are implemented by separate computer systems. In an embodiment, a suitable computer comprising memory and one or more processors includes executable instructions that, if executed, cause the one or more processors of the computer system to perform the steps 502-514 described in connection with FIG. 5. A suitable computer system, in an embodiment, refers to a computer system such as those described elsewhere in connection with FIG. 6.

In an embodiment, a suitable system (e.g., a computer system) identifies 502 a directory schema, wherein the directory schema is obtainable from a JSON file including a set of parameters for a multi-stage deployment of the directory schema to a set of directory servers/services. In an embodiment, the directory schema identified is an updated directory schema that should be applied to directory servers having older versions of the directory schema. In an embodiment, the system optionally provisions 504 computing resources, such as in a "single-box" testing environment in which a test machine (e.g., a computer system such as a virtual computer system that is created, instantiated, or otherwise provisioned for testing purposes) to determine whether a particular directory schema can be applied to a system configured in a particular manner (i.e., the test machine). In an embodiment, the provisioning step is optional and is included in some stages of a multi-stage deployment pipeline but not others.

In an embodiment, the system assumes 506 a role which may be utilized to test various aspects of a directory schema update. In an embodiment, assumption of a role is utilized to determine whether a particular set of permissions (e.g., those associated with a particular user) are sufficient to successfully apply a directory schema update. It should be note that the role assumed herein may be a different role that was discussed previously in connection with FIG. 4. In an embodiment, the assumption of a role is an optional step of the process, and may be omitted in some or all stages of a multi-stage deployment pipeline. In an embodiment, the role to assume is specified in JSON format and is associated with the performance of one or more steps of a directory schema update, such as applying a directory schema update to a directory service and/or running test code. In an embodiment, a suitable system assumes a role assumed in the manner described in accordance with FIG. 6. In an embodiment, if the system determines a role should be assumed, the system assumes a role by submitting a request to an authorization and/or authentication service and receives, in response, a token associated with the role provided by the authorization and/or authentication service that is usable to assume the role. A role, in an embodiment, has a set of permissions that grant and/or deny access to computing resources of a computing resource service provider—the permissions associated with the role may differ from the permissions associated with the system that assumes the role. In an embodiment, the system, upon receiving the security token, issues a request and includes the security token as part of the request, and an authorization service receives the request, determines whether the request should be fulfilled based on the permissions associated with the security token and/or role, and allows fulfillment of the request (e.g., by routing the request to the appropriate service) if the permissions associated with the security token and/or role are determined to be sufficient.

The system, in an embodiment, deploys 508 the directory schema to computing resources, such as those that were provisioned in connection with step 504 described above. In an embodiment, the system updates a directory schema operating or otherwise associated with the computing resources by providing the identified directory schema and/or runs migration code such as data migration code to backfill newly supported attributes in the update.

In an embodiment, test code is run 510 before, after, and/or during the deployment of a directory schema. In an embodiment, test code includes executable code that, if executed by one or more processors of a computer system, causes the computer system to perform one or more tests that are used to verify functionality of a directory service. In an embodiment, test code includes executable code that initializes a directory service to an initial state, performs one or more operations and/or commands, and verifies 512 one or more expected outcomes. For example, the test code provisions a test server with a directory service having a first directory schema, causes the test server to receive the directory schema, and runs update code to update the first directory schema to the directory schema included in the schema deployment configuration settings.

In an embodiment, the system determines whether 514 the outcome passed or failed based on a set of conditions. In an embodiment, the system passes the deployment if a set of predetermined expected outcomes match the actual outcomes obtained from the updated directory service. In an embodiment, a set of ancillary tests are verified such that a threshold percentage of the tests must pass in order for the outcome to be indicated as passed. In an embodiment, if the outcome passes, then the system indicates the deployment 516 passed and the system, in an embodiment, proceeds to the next stage of a deployment. If the system determines that the outcome failed, then the system, in an embodiment, rolls back 518 the deployment from the computing resources, such as by restoring the initial state of the directory service to a snapshot taken from before the process illustrated in FIG. 5 was performed.

Figure 6:
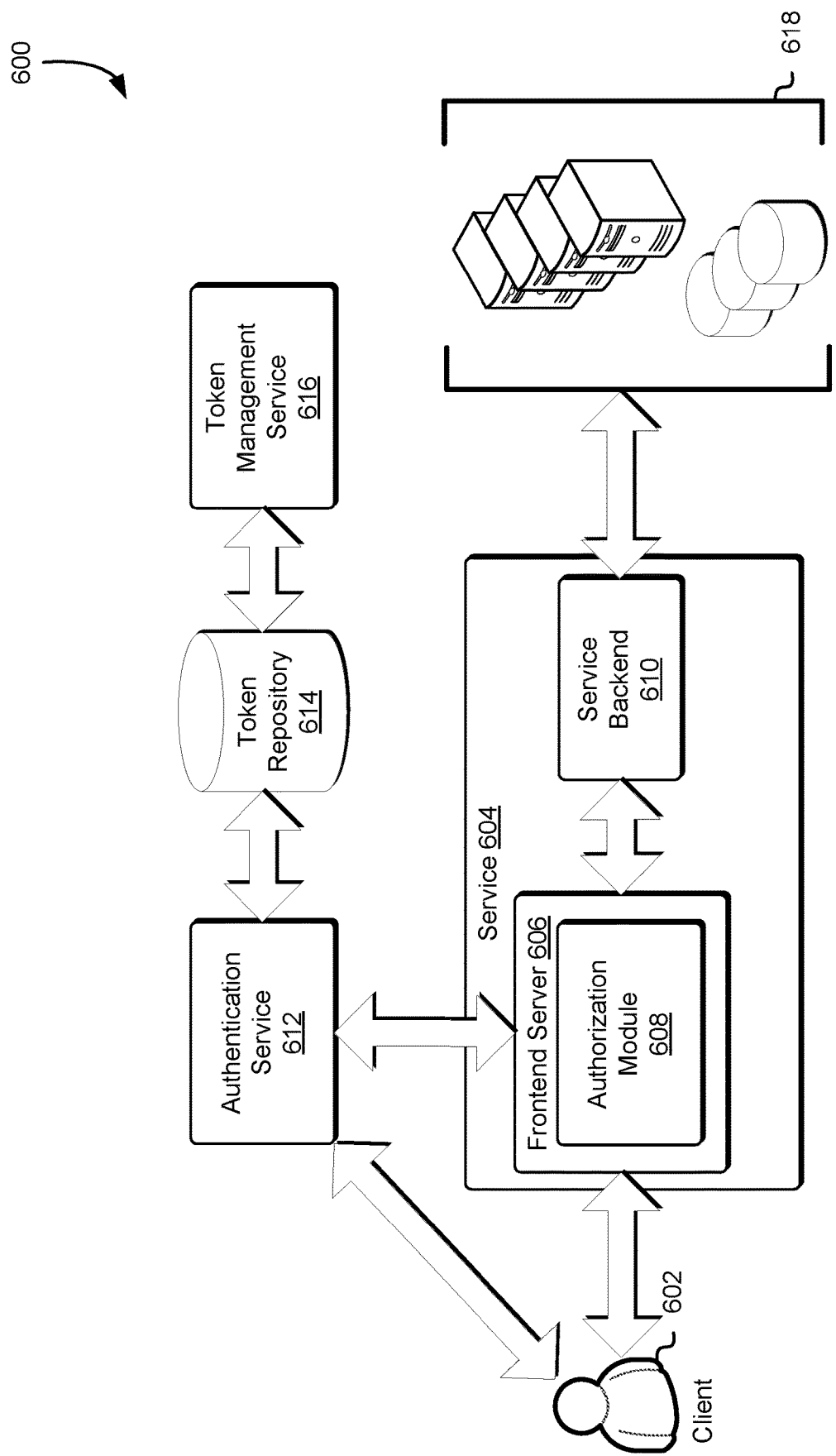
FIG. 6 illustrates a system in which various embodiments can be implemented.

FIG. 6 illustrates a system in which an embodiment can be implemented. In an embodiment, the system 600 illustrates a client 602 and a set of computing services that the client utilized in various embodiments such as those in accordance with FIGS. 4 and 5. In an embodiment, the system 600 includes a service 604, a frontend server 606, an authorization module 608, a service backend 610, an authentication service 612, a token repository 614, a token management service 616, and resources 618.

The client 602, in an embodiment, is any suitable computing entity, such as a suitable system for implementing processes described in accordance with FIG. 4 and/or FIG. 5. In an embodiment, the client 602 may be a user account having a set of credentials (e.g., a username and password) or an assumed role. In some embodiments, the client 602 is configured to communicate with a service 604 that provides access to computer resources as well as an authentication service 612 that enables users to create and use unique identities and authenticate them. In an embodiment (not shown in FIG. 6) the client communicates with a single service or endpoint that provides some or all of the services shown in FIG. 6 and includes both the components shown in the service 604 and authentication service 612 of FIG. 6.

In an embodiment, the service 604 is a service provider that is used to obtain resources or obtain access to resources. In an embodiment, the service 604 includes a frontend server 606 and a service backend 610, but in other embodiments one or more of the components of the service shown in FIG. 6 are performed by other components—i.e., the frontend server, service backend, and respective subcomponents therein do not necessarily need to be part of the service 604 but may be in a separate component accessible by the service 604.

In an embodiment, the client 602 communicates with the service 604 using API requests and assumes one or more roles prior to providing an API request. In an embodiment, API requests are handled at least in part by a frontend server 606. The frontend server may be hardware, software, or a combination thereof, in accordance with one embodiment—the frontend server, in an embodiment, includes an authorization module 608 or communicates with an authorization service (not shown in FIG. 6) that is a subservice of the frontend server or is a separate component from the frontend server. In an embodiment, the frontend server 606 is configured to receive API requests from a requestor such as the client 602, determine whether to grant the request, and access a service backend 610 to fulfill the request.

In an embodiment, the authorization module 608 is used to determine whether and/or how to fulfill a request and in some embodiments is a standalone service or a subservice of the frontend server 606 or service 604. In an embodiment, an authorization module 608 determines the permissions associated with a principal requesting access to one or more resources (e.g., resources 618 accessible by a service backend) by parsing a request, determining the permissions associated with the requestor, and determining how to handle the request. In an embodiment, the authorization module 608 uses the authentication service 612 to authenticate that the identity of the requestor is who it purports to be. In an embodiment, the authorization module makes a determination of whether the requestor should be granted access to one or more resources by checking security policies attached to the request resource, the requestor, the token, or some combination thereof. In an embodiment, the resource requested has a corresponding access control list that describes which principals (e.g., user accounts, groups, roles) may access the resource. In an embodiment, the access control list includes a blacklist of principals that affirmatively may not access the resource and supersedes any other policies ostensibly granting the blacklisted principal access to the resource. In an embodiment, a security policy is associated with the requestor or security token and resides in a security policy repository (not shown in FIG. 6) that is accessible via a database or any suitable data store such as via a data storage service.

In an embodiment, the frontend service 606 is configured to communicate with a service backend 610 that may be used to access one or more resources 618 that may be requested by the client. The resources 618 may be computer or electronic-based resources such as resources of a computing resource service provider including virtual computer systems (e.g., virtual machine instances), data storage systems, and directory services/servers.

In an embodiment, the authentication service 612 is used to perform identity related tasks, such as assuming roles. In an embodiment, an authentication service 612 is a computer system, computer system process, program application, service module, or a combination of these and/or other such computing system entities. In an embodiment, the authentication service 612 is configured to receive API requests from the client and supports APIs that enable a principal to assume a role. In an embodiment, a principal (e.g., a user account or role) requests to assume a role by specifying the requested role as part of an API request. In an embodiment, the authentication service provides, in response to a request to assume a role, a security token that includes a hash-based message authentication code (HMAC) encoding an expiration time.

In an embodiment, the authentication service 612 communicates with a token repository 614 that is used to store security tokens or portions thereof and implemented using one or more databases, or other types of structured storage. In an embodiment, the token repository utilizes a database structured as follows: a first role table such that each row of the table corresponds to a role, wherein the role further includes a data column that includes the security token associated with the role. In an embodiment, the data column includes an HMAC. In an embodiment, each row of the role table includes a primary key identifier that uniquely identifies a row. In an embodiment, a second association table stores, in each row of the second table, a reference to a principal (e.g., a resource name identifier) and a reference to a column in the role table correspond to a role that the principal may assume. In an embodiment, there are multiple rows in the association table for a given principal if the principal may assume multiple roles—e.g., one row for each role the principal may assume. In an embodiment, the authentication service 612 manages the token repository and determines which roles a principal may assume.

In an embodiment, a token management service 616 performs operations related to the management of security tokens. In an embodiment, the token management service generates a security token (e.g., a HMAC) when a role is created. In an embodiment, the token management service has access to a cryptographic key used for generating HMACs, but such need not be the case—a separate cryptography service may be used to generate HMACs. In an embodiment, an authentication tag (e.g., HMAC) is generated using various one-way hash functions such as a secure hash algorithm (e.g., SHA-256 algorithm).

Pre-image resistant functions include one-way functions (i.e., functions that may not be computationally difficult to compute for a current value, but may not be computationally trivial to determine a previous value from the current value), having a recurrence relationship to a previous value of the function. The one-way membership function may not be mathematically proven/provable as one-way, but have computational complexity properties that render the function pre-image resistant. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (e.g., with the password being based at least in part on the plaintext and the cryptographic key) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of pre-image resistance (given a value y, the probability of randomly generating an input x such that $f(x)=y$ is below a specified threshold), second pre-image resistance (given an input $x_1$, the probably of randomly generating another input $x_2$, different from $x_1$, such that $f(x_1)=f(x_2)$ is below a specified threshold) and/or collision resistance (the probability of two different inputs resulting in the same output is less than a specified threshold). One-way functions suitable for use in generating an identifier for data include functions that satisfy properties of collision resistance (i.e., the probability of $f(x_1)=f(x_2)$ for different $x_1$ and $x_2$ is below a threshold). In an embodiment, hash functions usable in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

Figure 7:
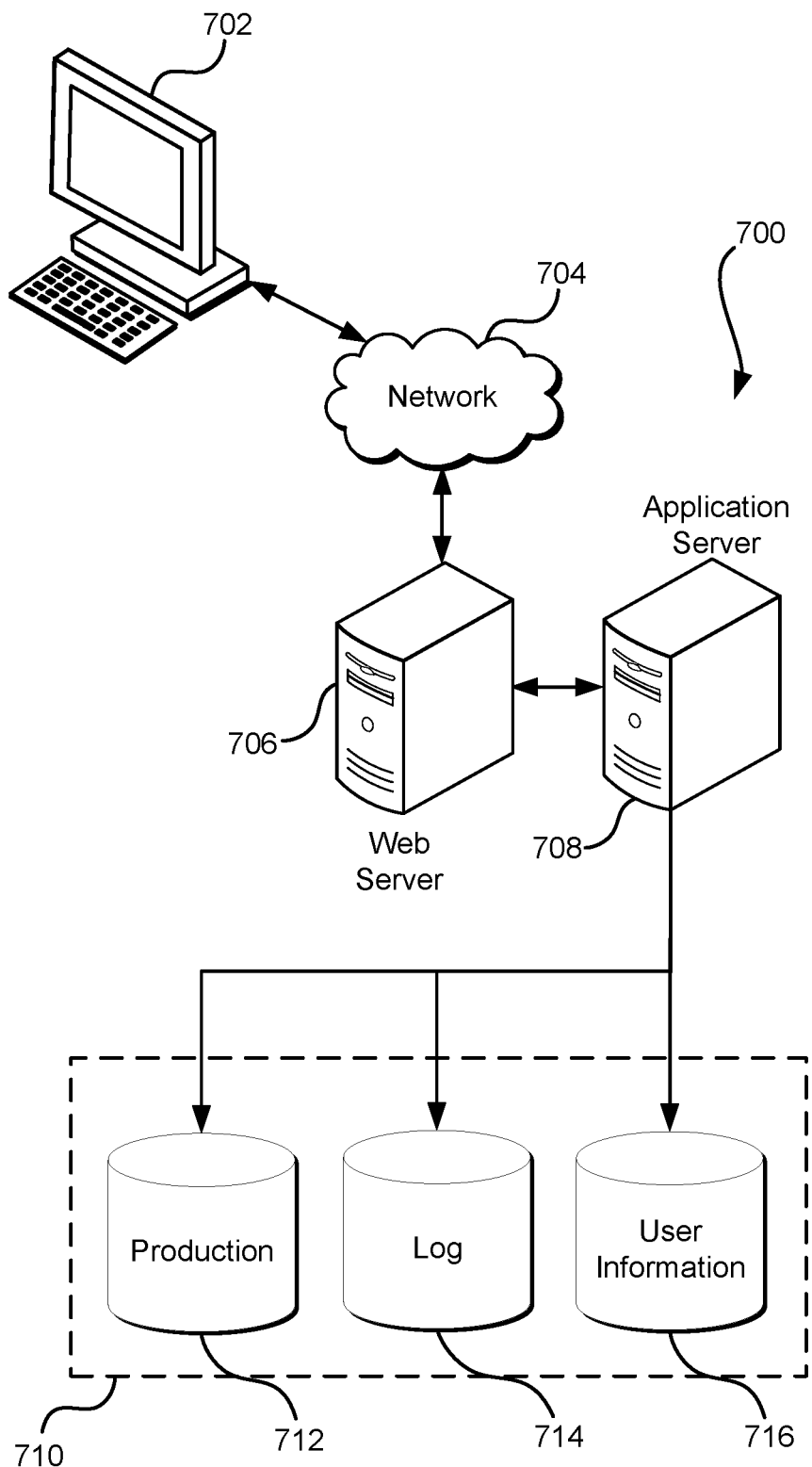
FIG. 7 illustrates a system in which various embodiments can be implemented.

FIG. 7 illustrates aspects of an example system 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages, or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 702 and the application server 708, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as My SQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a set of parameters for a multi-stage deployment of a directory schema to a set of directories, where stages of the multi-stage deployment are executed independently;

performing a first stage of the multi-stage deployment of
the directory schema according to the set of parameters
by at least:
provisioning a set of computing resources to implement
the directory schema, the set of computing resources
implementing a test environment to execute at least
one test of the directory schema;
selecting a first subset of the set of directories;
reconfiguring the first subset to update from a previous
directory schema to the directory schema; and
generating a result of executing the at least one test with
the first subset after reconfiguring the first subset by
at least assuming a role, based at least in part on a
token, to determine a set of permissions associated
with the first subset is sufficient to enable the role to
access the first subset; and
performing a second stage of the multi-stage deployment
to deploy the directory schema to a second subset of the
set of directories, where performance of the second
stage is independent of the result of the at least one test.

2. The computer-implemented method of claim 1, wherein:
the set of parameters comprises a uniform resource identifier (URI) identifying executable test code; and
performing the first stage of the multi-stage deployment further comprises:
using the URI to obtain the executable test code; and
running the executable test code in connection with the first subset to determine the first subset generates an actual outcome that matches an expected outcome.

3. The computer-implemented method of claim 1, wherein performing the first stage of the multi-stage deployment further comprises:
identifying a subset of computing resources of the set of computing resources associated with the first subset of the set of directories; and
wherein provisioning the set of computing resources further comprises provisioning the subset of computing resources with the directory schema according to the previous directory schema.

4. The computer-implemented method of claim 1, further comprising, in response to detecting an unsuccessful testing of the first subset, performing a mitigation; and
wherein the second stage of the multi-stage deployment is performed in parallel with the first stage of the multi-stage deployment.

5. A system, comprising one or more non-transitory machine-readable mediums storing thereon a set of instructions that, as a result of being executed by one or more processors, cause the system to at least:
instantiate a first computer system within a test environment;
apply a first directory schema to a directory of the first computer system;
perform a first deployment of a second directory schema of a multi-stage deployment by at least:
providing the second directory schema to the first computer system;
causing the first computer system to reconfigure the directory according to the second directory schema; and
generating a test result by at least assuming a role to determine access associated with the role to the second directory schema;
determine, based at least in part on the test result, to deploy the second directory schema to at least another computer system; and
cause a second deployment of the multi-stage deployment to be performed independent of the test result.

6. The system of claim 5, wherein:
a deployment file comprises:
the second directory schema; and
information indicating the first computer system; and
the instructions to perform the deployment of the second directory schema comprise instructions that, as a result of being executed by the one or more processors, cause the system to:
obtain the deployment file; and
determine, based at least in part on the deployment file, to provide the second directory schema to the first computer system.

7. The system of claim 6, wherein:
the deployment file further comprises one or more conditions that indicate the deployment is successful; and
the set of instructions further include instructions that, as a result of being executed by the one or more processors, further cause the system to determine, based at least n part on the deployment file, that the deployment succeeded.

8. The system of claim 7, wherein:
the deployment file further comprises an indication of executable test code;
the instructions to perform the deployment further comprise instructions that, as a result of being executed by the one or more processors, cause the system to:
use the deployment file to obtain the executable test code; and
run the executable test code in connection with the first computer system to determine the first computer system generates an actual outcome that matches an expected outcome; and
the one or more conditions comprise detecting the actual outcome matches the expected outcome.

9. The system of claim 6, wherein the deployment file is encoded in a JavaScript Object Notation (JSON) compatible format.

10. The system of claim 8, wherein the instructions to perform the deployment further comprise instructions that, as a result of being executed by the one or more processors, cause the system to:
instantiate one or more virtual computer systems; and
apply the second directory schema to the one or more virtual computer systems as a result of the actual outcome matching the expected outcome.

11. The system of claim 5, wherein the first computer system is configured on a first network and another system is configured on a second network isolated from the first network.

12. The system of claim 5, wherein the set of instructions comprise instructions that, as a result of being executed by the one or more processors, further cause the system to assume a second role to perform the deployment.

13. A non-transitory computer-readable storage medium storing thereon executable instructions that, as a result of being executed by one or more processors of a computer system, cause the computer system to at least:
perform a first stage of a multi-stage deployment by at least:
provisioning a first computer system such that a directory of the first computer system is provisioned in accordance with a first directory schema;
making a second directory schema available to a first computer system;

reconfiguring the directory according to the second directory schema; and determining, based at least in part on a result of testing the second directory schema by at least determining access to the second directory schema associated with a role, to deploy the second directory schema to at least another computer system; and causing a second stage of the multi-stage deployment to be performed independent of testing the second directory schema.

14. The non-transitory computer-readable storage medium of claim 13, wherein the instructions further comprise instructions that, as a result of being executed by the one or more processors, cause the computer system to, contingent upon determining to not deploy the second directory schema to the at least another computer system, cause the first computer system to reconfigure the directory according to the first directory schema.

15. The non-transitory computer-readable storage medium of claim 13, wherein the instructions further comprise instructions that, as a result of being executed by the one or more processors, cause the computer system to cause the first computer system to determine one or more operations performed on the directory cause an actual outcome that matches an expected outcome.

16. The non-transitory computer-readable storage medium of claim 13, wherein the second directory schema includes an attribute the first directory schema lacks.

17. The non-transitory computer-readable storage medium of claim 16, wherein the instructions further comprise instructions that, as a result of being executed by the one or more processors, cause the computer system to:

obtain data from the directory, wherein the data is associated with one or more attributes shared by the first directory schema and the second directory schema; and in response to detecting the directory, configure the directory according to the second directory schema:

determine additional data based at least in part on the data associated with the one or more attributes shared by the first directory schema and the second directory schema; and store the additional data in connection with the attribute.

18. The non-transitory computer-readable storage medium of claim 13, wherein the directory is a Lightweight Directory Access Protocol (LDAP) directory.

19. The non-transitory computer-readable storage medium of claim 13, wherein the instructions further comprise instructions that, as a result of being executed by the one or more processors, cause the computer system to cause the first computer system to create an index on an attribute of the second directory schema.

20. The non-transitory computer-readable storage medium of claim 13, wherein the instructions that cause the computer system to deploy the second directory schema to the at least another computer system further comprise instructions that, as a result of being executed by the one or more processors, cause the computer system to deploy the second directory schema to the at least another computer system without regard to whether the at least another computer system has received intermediate updates to directories of the at least another computer system.

* * * * *